(12) United States Patent
Cozzolino

(10) Patent No.: US 6,428,871 B1
(45) Date of Patent: Aug. 6, 2002

(54) METHOD OF MANUFACTURING DECORATIVE WOOD PRODUCTS FROM ENGINEERED WOOD PRODUCTS

(76) Inventor: Michael Cozzolino, 11 Parsonage Lot Rd., Lebanon, NJ (US) 08833

( * ) Notice: Subject to any disclaimer, the term of this patent is extended or adjusted under 35 U.S.C. 154(b) by 0 days.

(21) Appl. No.: 09/566,158

(22) Filed: May 5, 2000

(51) Int. Cl.[7] .............................. B32B 3/10; B32B 21/04
(52) U.S. Cl. ......................... 428/50; 428/44; 144/345; 144/346; 144/350; 144/351
(58) Field of Search ................. 144/351, 350, 144/346, 345; 428/50, 44

(56) References Cited

U.S. PATENT DOCUMENTS

| 108,781 | A | 11/1870 | Hamilton |
| 329,828 | A | 11/1885 | Green |
| 436,041 | A | 9/1890 | Koskul |
| 451,834 | A | 5/1891 | Murch |
| 598,437 | A | 2/1898 | Piver |
| 1,028,703 | A | 6/1912 | Fulton |
| 1,078,776 | A | 11/1913 | Dunton |
| 1,931,650 | A | 10/1933 | Elmendorf .................... 20/7 |
| 2,037,259 | A | 4/1936 | Murphy et al. ............... 20/75 |
| 2,118,841 | A | 5/1938 | Elmendorf .................... 20/75 |
| 3,128,511 | A | 4/1964 | Tibbals ....................... 20/78.3 |
| 3,209,500 | A | 10/1965 | Bernett ....................... 52/309 |
| 3,282,010 | A | 11/1966 | King .......................... 52/582 |
| 3,365,850 | A | 1/1968 | Marino ....................... 52/309 |
| 3,579,410 | A | 5/1971 | Barrett ....................... 161/38 |
| 3,730,797 | A | 5/1973 | Jensen ........................ 156/182 |
| 3,810,774 | A | 5/1974 | Pittman ....................... 117/12 |
| 3,887,736 | A | 6/1975 | Kaswell ...................... 428/87 |
| 3,905,172 | A | 9/1975 | Blackburn .................... 52/741 |
| 4,064,301 | A | * 12/1977 | Howard |
| 4,774,794 | A | * 10/1988 | Grieb ......................... 52/309.7 |
| 4,784,887 | A | * 11/1988 | Abendroth |
| 4,890,656 | A | * 1/1990 | Ohsumi et al. |
| 5,182,892 | A | 2/1993 | Chase ......................... 52/539 |
| 5,322,584 | A | 6/1994 | Severson et al. ........... 156/257 |

FOREIGN PATENT DOCUMENTS

WO    WO 98/10157   * 3/1998

* cited by examiner

Primary Examiner—Shrive P. Beck
Assistant Examiner—Elena Tsoy
(74) Attorney, Agent, or Firm—Wolff & Samson

(57) ABSTRACT

The present invention relates to a method for forming a decorative, resilient, wood product from an engineered structural wood product. The invention includes utilizing a sheet of engineered structural wood product, cutting the sheet lengthwise into planks, stacking the planks and adhering the planks together and slicing the edge grain off the adhered planks and placing the slices side-by-side to form large areas of exposed side grain. The slices can be attached to a substrate, and the slices can be further treated to produce a decorative wood product.

22 Claims, 4 Drawing Sheets

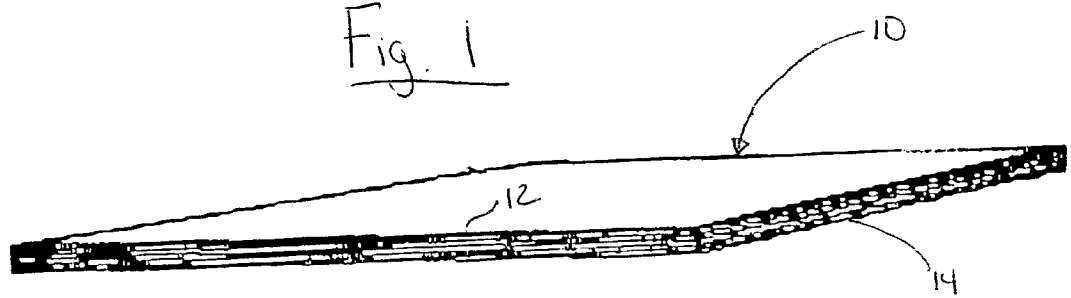
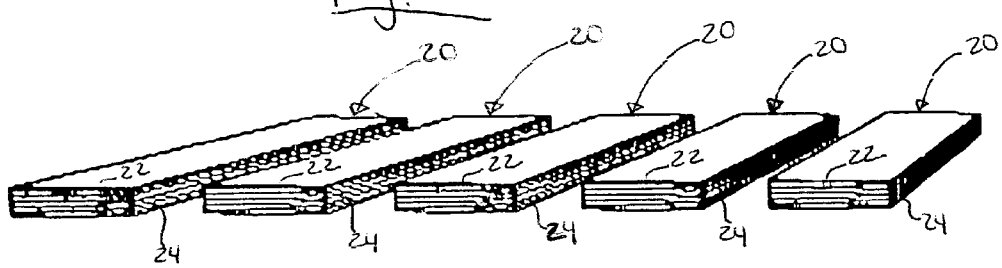

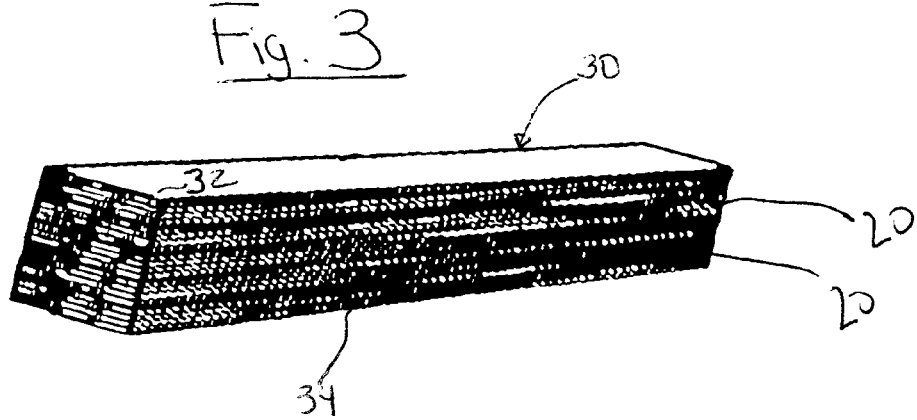
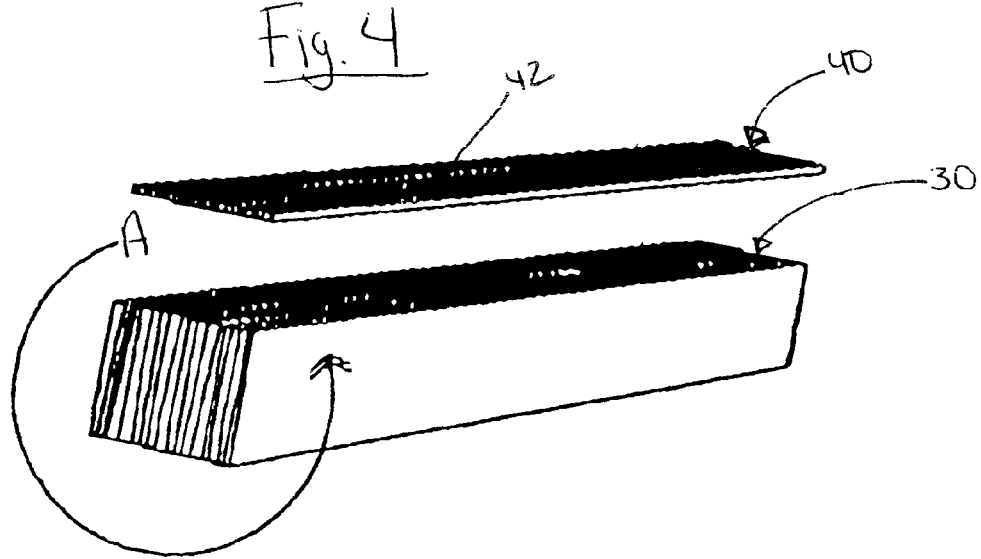

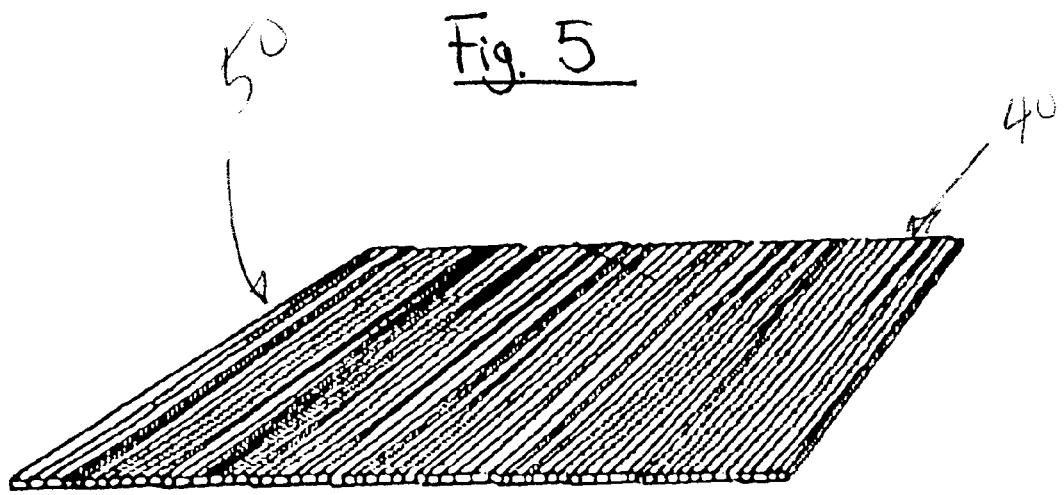

METHOD OF MANUFACTURING DECORATIVE WOOD PRODUCTS FROM ENGINEERED WOOD PRODUCTS

BACKGROUND OF THE INVENTION

1. Field of the Invention

The present invention relates to a method of manufacturing decorative wood products from engineered structural wood products, and more particularly, to a method of creating a decorative product with an exposed side grain from an engineered structural wood product.

2. Related Art

It has long been known to expose wood grain for decorative purposes. Indeed, flooring, walls (paneling) and even furniture including such things as tables, desks, etc., often display wood grain for decorative purposes. The wood grain gives a nice texture and design to the surface of the decorative wood product. Sometimes the effect of wood grain is obtained through the use of veneers which can be arranged and manipulated to present wood grain designs.

It is also known that the end grain of wood presents a nice design and provides a very resilient surface that makes it desirable for use in flooring. Numerous previous patents disclose methods, and products made by such methods, for creating decorative wood products that feature wood grain. These efforts include the following patents:

Green, U.S. Pat. No. 329,828, which discloses wooden flooring and wainscoting for providing highly ornamental flooring that is durable and free from liability to become disfigured by constant wear or contact therewith of hard substances. The flooring includes blocks of uniform shape and size each having a central piece surrounded by side pieces forming borders about the central piece. The central piece and the side pieces each have the end grain running in a different direction from that of the others while the length of the grain stands at an angle of 45 degrees to the plane of the surface. The side pieces are attached to the central portion by glue prior to cutting and then the whole composite is cut through diagonally. The patent indicates that the flooring is durable because the inclination of the grain at about 45 degrees from horizontal is the best position for resisting wear.

Marino, U.S. Pat. No. 3,365,850, discloses dimensionally stable wood flooring constructed of wood fillets having limited width. Each fillet is adhered to adjacent fillets by materials that absorbs dimensional changes in the contiguous fillets.

Severson, et al., U.S. Pat. No. 5,322,584, discloses a method of making wooden tile wherein each block contains at least one lateral groove extending parallel to and spaced inwardly from the edges of the block and at least one longitudinal groove extending parallel to and spaced inwardly from the side edges of the block and intersecting the lateral groove at a right angle. When the blocks are aligned in abutting relationship, the grooves form a grid-like network of continuous, rectilinear channels which can be filled with a flowable synthetic plastic material which can then be cooled to bond the wood together.

Chase, U.S. Pat. No. 5,182,892, discloses a tongue and groove board product where the tongue has at least one vertically extending opening which allows for a drain path for water to drain from the surface.

Jensen, U.S. Pat. No. 3,730,797, discloses parquet building boards. The narrow faces are secured to a flat base and the grain runs parallel to the base.

King, U.S. Pat. No. 3,282,010, discloses a parquet flooring block formed from a plurality of squares. A mechanical connecting means eliminates the need for adhesives.

Tibbals, U.S. Pat. No. 3,128,511, discloses parquet flooring block wherein the wooden slats are secured together by one or more wires recessed in the under-surface of a block.

Elmendorf, U.S. Pat. No. 2,118,841, discloses flexible end grain wood floor covering using a comparatively thin layer of wood. The wood is sliced and then split and then placed closely together and glued to the underlying floor to prevent warping of entire sheets.

Murphy, et al., U.S. Pat. No. 2,037,259, discloses wood flooring comprising a plurality of thin layers of wood joined together by alternately placing side by side a layer of end grain wood and a layer of side grain wood to provide maximum wearing qualities and strength, respectively. The layers are adhered together and then can be glued down to form a surface.

Elmendorf, U.S. Pat. No. 1,931,650, discloses a floor covering comprised of a plurality of small blocks or tiles having a binding material therebetween to form a floor covering. The wooden blocks may show end grain.

Dunton, U.S. Pat. No. 1,078,776, discloses wood flooring in which the end grain is presented in small blocks or sections joined together. Essentially planks of wood are stacked, sliced to present end grain, sliced again for sizing, and then the sides are detailed for attachment of the strips together.

Fulton, U.S. Pat. No. 1,028,703, discloses a wooden floor covering. The flooring is created by cementing a number of slabs of wood together to form a composite. The composite is sliced and then cemented together to form a compound block.

Piver, U.S. Pat. No. 598,437, discloses composite flooring having an exposed edge grain.

Murch, U.S. Pat. No. 451,834, discloses a method of cutting wood for ornamental purposes by obliquely cutting through a piece of wood with the bark on the wood and then shaping the piece by removing bark.

Koskul, U.S. Pat. No. 436,041, discloses ornamental wood working by forming piles of wood from which veneers, slabs and blocks may produced which present the end grain of the wood which are sawed or cut from the respective pilings.

Hamilton, U.S. Pat. No. 108,781, discloses a tessellated floor made up of blocks of wood arranged to show the end grain. Portions may be cut out of the blocks into geometric shapes and filled with wood plugs to create designs.

It has also been known, in the past, to utilize materials other than natural wood product to create floors and other decorative or useful wood products from other natural materials and from synthetic materials. However, often times, synthetic materials cannot provide the warmth, texture or richness of wood products. Although efforts may be made to attempt to infuse "wood" characteristics into a synthetic material, such efforts heretofore have not been generally successful. Some work in the area of using wood product or synthetic materials include the following:

Kaswell, U.S. Pat. No. 3,887,736, discloses a synthetic end grain block defining a wear surface. The block has a top surface, a bottom surface parallel to the top surface and a peripheral surface connecting the top and bottom surfaces. The block comprises a plurality of wear fibers extending therewithin substantially perpendicular to the top and bottom surfaces, and an organic plastic material binding the fibers together. The blocks include a plurality of wear fibers that may be natural or synthetic. Synthetics include rayon, acetate, protein, nylon, polyester, acrylic, olefin, glass, modacrylic, saran, tetrafluorethylene, vinyon, vinyl, nytril, polystyrene, rubber, spandex and extruded monofilaments. Natural materials include cotton, line, jute, abaca, sisal, rubber and henequen. Normally, the blocks are impregnated with a resin such as phenol formaldehyde, resorcinol formaldehyde, alkyd, polyamide, epoxy, and polyester.

Blackburn, U.S. Pat. No. 3,905,172, discloses a method of laying wooden floors by placing preformed groups of end cuts of timber on a base and pouring adhesive between the groups of end cuts and polishing the hardened surfaces of the floor to expose the cross grain of the timber. The groups of end cuts are formed by securing lengths of timber together in a bundle, adhering them together, and cross cutting the bundle into slices.

Pittman, U.S. Pat. No. 3,810,774, discloses a wall panel that resembles an actual wood plank having an outer decorative surface which is printed and decorated to resemble a wood plank. The printing is done step wise, first the wood undertone is printed, then a pattern is printed and then finely defined details of the wood grain are printed. Each printing is done in a different color and the final result resembles the appearance of actual wood planks.

Barrett, U.S. Pat. No. 3,579,410, discloses prefinished parquet flooring impregnated with a monomer that is polymerized to have a high resistance to abrasive wear.

Bernett, U.S. Pat. No. 3,209,500, discloses a wooden base covered with tile. Ceramic is bonded to the wood and substrate with epoxy resin.

It is also known that structural wood products can be engineered effectively for use as structural components such as for the core of doors, etc. Engineered structural wood products are also known as "structural composite lumber" or "SCL." One such engineered structural wood product is manufactured and sold by Trus Joist MacMillan under the trademark TimberStrand. TimerStrand is made by using small trees from a wide variety of species, cleaning and debarking the trees and cutting same into strands up to twelve inches long, drying the strands and coating the strands with a formaldehyde-free adhesive. The coated strands are then aligned parallel to each other to take advantage of the natural strength of the wood and passed through a steam injection pressing process which laminates the strand into solid billets of wood up to four and a half inches thick. The billets can then be cut to specification. The primary known use for such engineered wood product is as structural composite lumber for use in the core of wood doors, because it combines the screw holding and bending properties of lumber with the engineered stability of a particleboard core. One benefit of this structured wood product is that small trees can be used and the demand is lessened for harvesting trees from valued and protected old growth forests. However, one drawback with the engineered lumber is that it is not decorative as formed, i.e. the faces of the finished product are not decorative.

What would be desired, but has not yet heretofore been developed, is to provide a process wherein an engineered wood product could be made into a decorative wood product to take advantage of the structured wood product features, while providing a decorative end product.

OBJECTS AND SUMMARY OF THE INVENTION

It is a primary object of the present invention to process engineered wood products, such as SCL, into decorative wood products.

It is a further object of the present invention to provide a method for creating a decorative wood product from an engineered wood product.

It is another object of the present invention to provide a decorative wood product which presents a side grain or edge from an engineered wood product.

It is even another object of the present invention to provide a decorative wood product which accentuates side or edge grain features of an engineered wood product.

It is a further object of the present invention to provide an inexpensive decorative wood product.

It is even a further object of the present invention to provide a resilient decorative wood product from a engineered wood product, that can be used for flooring or for any other desired purpose.

The present invention relates to a method for forming a decorative, resilient, wood product from an engineered structural wood product. The invention includes utilizing a sheet of engineered structural wood product, cutting the sheet into planks, stacking the planks and adhering the planks together, slicing the adhered planks to present the side or edge grain, and placing the slices side-by-side to form large areas of wood product with exposed side grain. The slices can be attached to a substrate for use in any desired manner. The slices can be further treated to produce a decorative effect.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

The present invention relates to a method of manufacturing decorative hard wood products from an engineered structural wood product such as SCL. This invention utilizes a series of manufacturing steps to expose the side grain of the engineered structural wood product to create a decorative wood product that includes the structural advantages, such as stability, of the engineered structural wood product.

Figure 1:
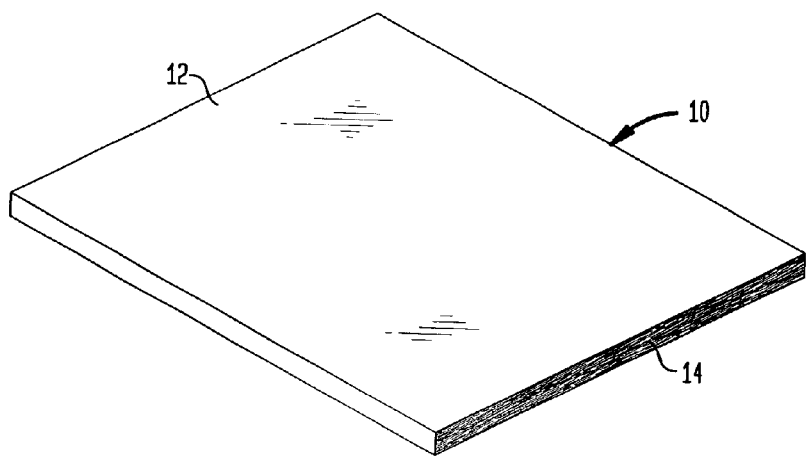
FIG. 1 is a perspective view of a sheet of engineered structural wood product.

Referring to FIG. 1, the present invention starts out with a sheet of engineered structural wood product, which is generally indicated at 10. One such product, as previously set forth, is known as Timberstrand, and is manufactured by Trus Joist MacMillan. The sheet can be manufactured to any desired dimensions, a typical dimension is four feet by ten feet by one and three quarters inch. The top surface 12, and the bottom surface are generally unattractive and have been subjected to forces and conditions associated with a steam press device. However, if properly processed, the edge grains 14, can provide an appealing looking surface. The present invention is designed to take advantage of the appealing side grain 14 by exposing same.

Figure 2:
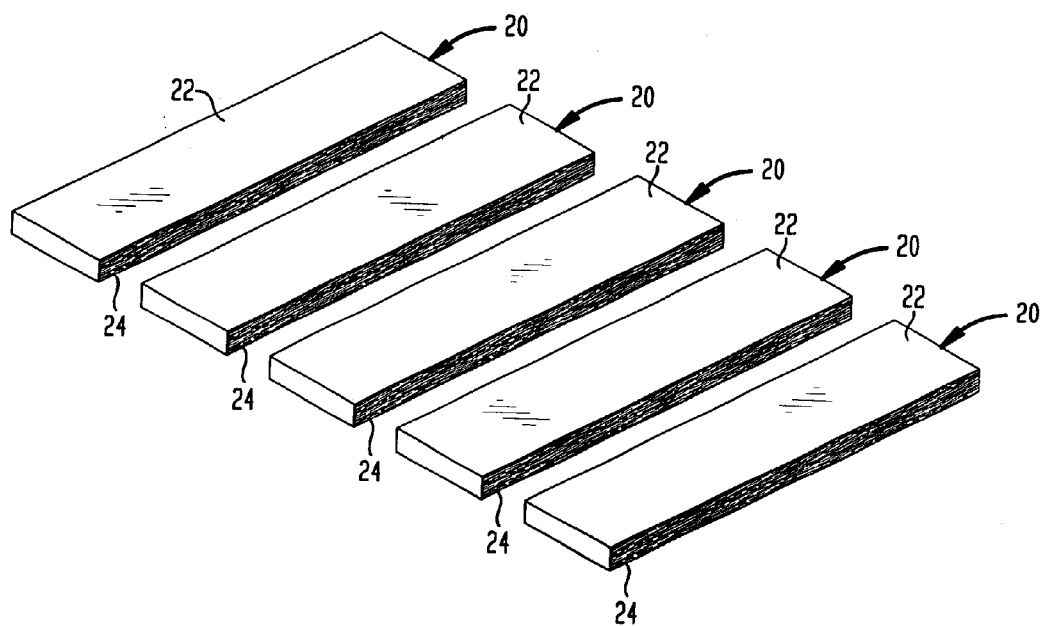
FIG. 2 shows the sheet of structural wood product of FIG. 1 cut into planks having a similar width.

Referring to FIG. 2, the sheet 10 is cut up into planks 20 each having a top surface 22 and exposed side grain 24. It is preferable to cut the sheets into substantially equal sizes. A preferable size is eight inches by ten feet by one and three quarters of an inch. However, this can be varied as desired.

Figure 3:
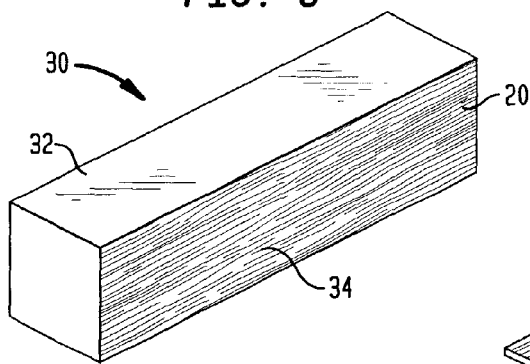
FIG. 3 shows the planks of FIG. 2 positioned in a stack.

Thereafter, as shown in FIG. 3, the planks 20 are placed on the other to form a stack. The stack has a top 32 and an exposed end grain 34. The stacked planks are then laminated together to create a formed stack 30. As is generally known, the lamination process can be performed in a hot platen press, such as for example at 42 P.S.I. utilizing a catalyzed glue line, to create a strong and waterproof bond between the planks 20. One such press is a Hofer Veneer press. It has been found that 42 P.S.I. for one hour provides a sufficient bond between the planks 20. It should be noted that a number of stacks of planks can be pressed into formed stacks in a single operation.

Figure 4:
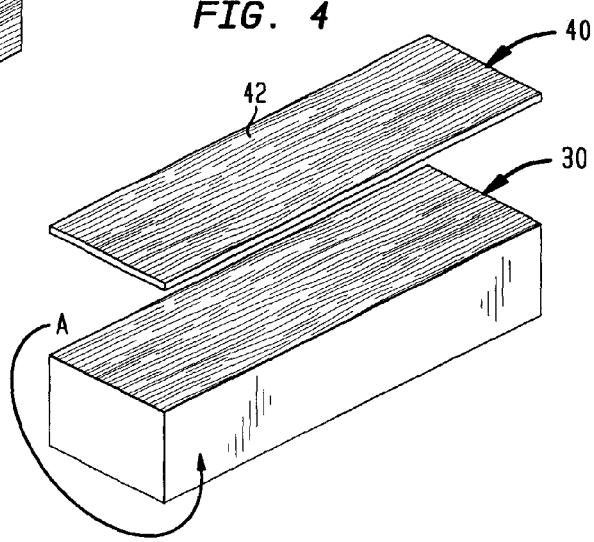
FIG. 4 shows a slice off of the stack shown in FIG. 3.

Referring now to FIG. 4, it can be seen that the formed stack 30 can be rotated as shown by arrow A and sliced into sheets 40 have an exposed edge grain along the upper surface 42. The formed stacked 30 can be sliced into numerous sheets 40 of whatever thickness is desired. For example, it has been found that half inch thick sheets 40 which measure one half inch by eight and three quarters of an inch by ten feet, are a suitable size for utilization of the sheets 40 as a decorative wood product side-by-side and made into larger pieces for panels, moldings, furniture, etc.

Figure 5:
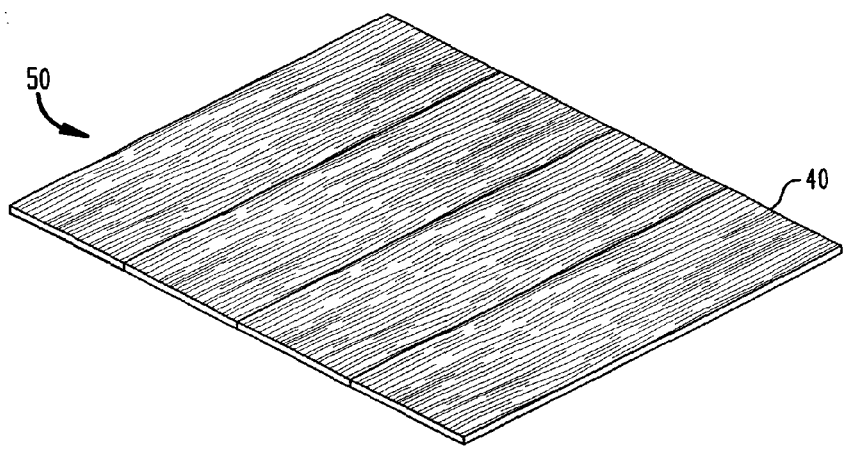
FIG. 5 shows a plurality of slices of FIG. 4, lined up to form a surface of exposed side or edge grain.
Figure 6:
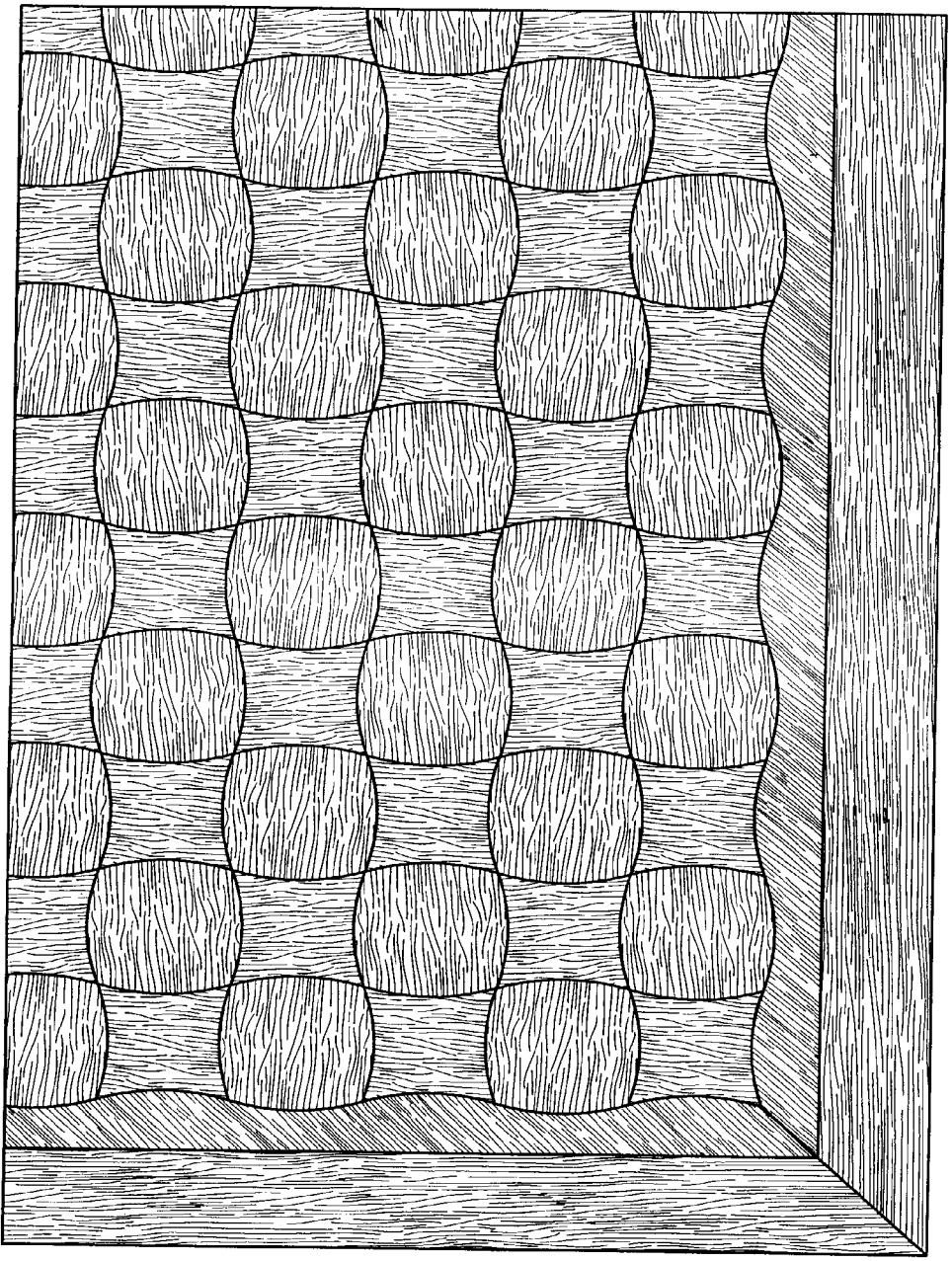

As shown in FIG. 5, the sheets 40 can be positioned side-by-side to form a large area of decorative wood product 50. Importantly, when placed side by side, sheets 40 form a large area of decorative wood product 50 wherein the seams between sheets 40 are not visible. Preferably the sheets 40 can be laminated to a substrate such as Luan plywood. The lamination process could take place in a hot press. The Luan is typically four feet wide and can be busted up into four and a quarter inch sticks and can be machined so that they can be interconnected by means of a tongue and groove, as is known in the industry.

Further, the sheets 40 can be utilized, as desired, to form any decorative wood product, including, but not limited to, panels, moldings, furniture, etc.

Importantly, it may be desirable to treat the exposed side grain of the decorative wood product 50. First, a planar may be used to preliminarily finish the surface. A planar is essentially an aggressive sander which will provide a generally smooth surface to the decorative wood product 50. The planar can be followed-up with another sander until the floor is suitably smooth. Thereafter, the decorative wood product 50 can be finished with a polyurethane floor finish to which it may be desirable to add a catalyzer. Thereafter, the surface can be installed as it is known to install any wood floor.

Further, the decorative wood product 50 can be finished with a stain, such as a translucent stain or a clear coat with a two component urethane floor finish. Again, the product can be finished in accordance with what is known in the industry.

For creating interesting effects, a wire wheel sander can be used to open up the porous surface, and then the grooves can be refilled with various desired materials, which could have various desired colors. Examples of such materials include wood floor fillers, pigmented polyesters, and liquid or solid epoxy compounds. Then, the decorative wood product could be sanded again and urethaned to create effects and utilize colors to obtain different styles of wood product. One such design could be a straight chisel look wherein grooves are "chiseled" into the wood product and the grooved wood product could be re-filled to highlight the chiseled effect.

Figure 6:
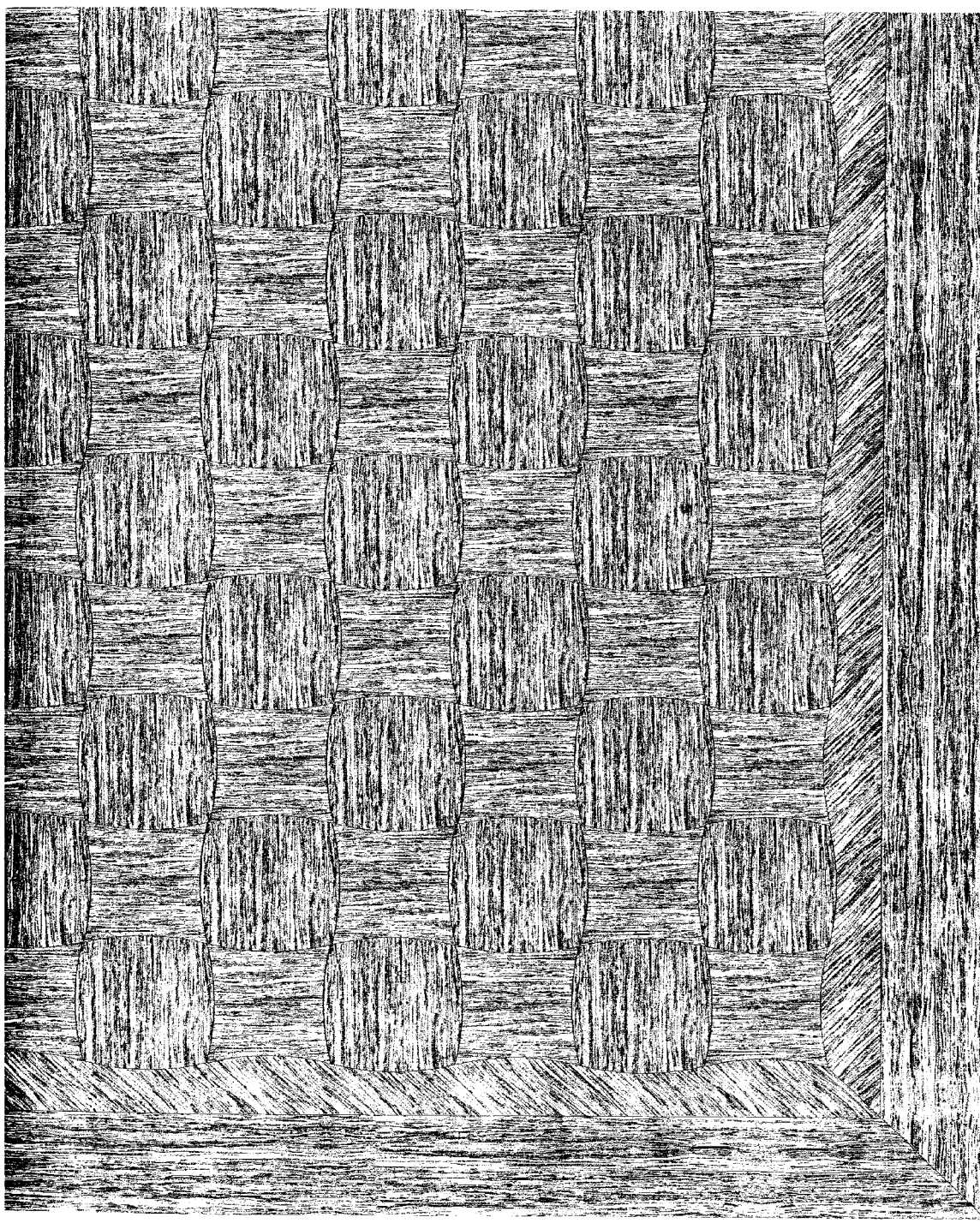
FIG. 6 shows an example of a decorative wood product manufactured in accordance with the present invention.

FIG. 6 is one example of a decorative wood product finished according to the present invention. As can be seen, the floor can be patterned, or alternatively, can be formed having an overall appearance of side grain without boundaries between adjacent planks.

To create wall or ceiling panels, the eight inch sheets can edge glued together to create the size sheet needed, and also laminated to quarter inch Luan plywood sheets. The surface can be finished in a similar manner as the floor, and can be wire brushed to create a visually interesting, strongly textured surface.

The density of the engineered material allows it to be carved and machined and molded into furniture. However, the finishing of the furniture before sanding generally requires the coating of the surface with wood filler, pigmented polyesters and/or liquid or solid epoxy compounds. The furniture is then sanded down to the original wood for a completely smooth surface. Pieces can then be finished in a manner appropriate to use.

Having thus described the invention in detail, it is to be understood that the foregoing description is not intended to limit the spirit and scope thereof. What is desired to be protected by Letters Patent is set forth in the appended claims.

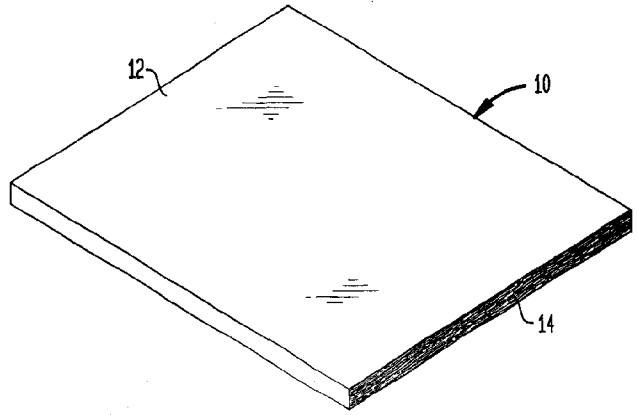

What is claimed is:

1. A method of forming a decorative wood product from an engineered structural wood product formed of a plurality of cut wood strands aligned and adhered together, the method comprising:

providing an engineered structural wood product formed of wood strands, the product having an edge grain formed by the strands;

slicing the engineered structural wood product into a plurality of planks having edge grains formed by the strands;

stacking the planks;

adhering the stacked planks together to form a composite plank;

slicing the composite plank into sheets with exposed edge grain formed by the strands; and attaching the sheets with exposed edge grain formed by the strands to a substrate.

2. The method of claim 1 further comprising finishing the exposed side grain by sanding.

3. The method of claim 2 further comprising the step of coating the finished edge grain with a translucent protective covering.

4. The method of claim 3 wherein the covering is urethane.

5. The method of claim 1 wherein the substrate is cut into strips for forming floor planking.

6. The method of claim 5 wherein the substrate is formed into a tongue and groove configuration for installation as flooring.

7. The method of claim 1 wherein the sheets with exposed edge grain are edge glued to form a large sheet of material with exposed edge grain.

8. The method of claim 7 wherein the large sheet is adhered to a substrate.

9. The method of claim 1 wherein the edge grain is finished by wire brushing.

10. The method of claim 9 wherein grooves formed by wire brushing are filled in with a colored material to provide a decorative effect.

11. A method of forming a decorative wood product from an engineered structural wood product formed of a plurality of cut wood strands aligned and adhered together, the product showing side grain of the wood product formed by the strands, the method comprising:

provinding an engineered structural wood product formed of wood strands with a side grain formed by the strands;

cutting the engineered structure wood product to successively expose the side grain formed by the strands of the product;

stacking the cut wood product with the exposed side grain formed by the strands aligned;

adhering the stack of cut wood product together with the aligned side grain formed by the strands exposed; and slicing the adhered stack to form sheets with the aligned side grain formed by the strands exposed.

12. The method of claim 11 further comprising installing the sheets with aligned exposed side grain on a substrate for forming flooring.

13. The method of claim 12 further comprising the step of finishing the exposed side grain surface of the decorative wood product.

14. A decorative wood product formed from an engineered structural wood product formed of a plurality of cut wood strands aligned and adhered together comprising:

an upper surface presenting side grain formed by the wood strands, the upper surface formed by stacking and adhering together a plurality of pieces of structural engineered wood product with similarly oriented side grain formed by the cut wood strands, and slicing the stacked product to expose the side grain formed by the wood strands; and finishing the upper side grain surface.

15. The product of claim 14 further comprising adhering a bottom surface of the decorative wood product to a substrate.

16. The decorative wood product of claim 14 wherein the upper surface is finished by sanding and clear coating.

17. The article of claim 16 wherein the upper surface is decorated by gauging and refilling with desired materials.

18. The method of claim 13 wherein the step of finishing comprises grooving with a wire wheel sander.

19. The method of claim 18 further comprising filling the grooves with materials.

20. The method of claim 13 wherein the step of finishing comprises grooving with a chisel.

21. The method of claim 20 further comprising filling the grooves with materials.

22. A method of forming a decorative wood product comprising:

cutting up wood material into strands up to approximately twelve inches long;

coating the strands with adhesive;

aligning the strands and adhering the strands together under pressure to form a structural wood product;

slicing the structural wood product into a plurality of planks exposing edge grain fromed by the strands;

stacking and adhering the planks together to form a composite plank; and slicing the composite plank into sheets with the exposed edge grain formed by the strands.

* * * * *

UNITED STATES PATENT AND TRADEMARK OFFICE
CERTIFICATE OF CORRECTION

PATENT NO.    : 6,428,871 B1
DATED         : August 6, 2001
INVENTOR(S)   : Michael Cozzolino It is certified that error appears in the above-identified patent and that said Letters Patent is hereby corrected as shown below:

The title page should be deleted to appear as per attached title page.

The sheets of drawings consisting of figures 1-6 should be deleted to appear as per attached Figures 1-6.

Signed and Sealed this

Twenty-second Day of April, 2003

JAMES E. ROGAN
*Director of the United States Patent and Trademark Office*

United States Patent
Cozzolino

(10) Patent No.: US 6,428,871 B1
(45) Date of Patent: Aug. 6, 2002

(54) METHOD OF MANUFACTURING DECORATIVE WOOD PRODUCTS FROM ENGINEERED WOOD PRODUCTS

(76) Inventor: Michael Cozzolino, 11 Parsonage Lot Rd., Lebanon, NJ (US) 08833

(*) Notice: Subject to any disclaimer, the term of this patent is extended or adjusted under 35 U.S.C. 154(b) by 0 days.

(21) Appl. No.: 09/566,158

(22) Filed: May 5, 2000

(51) Int. Cl.$^7$ .......................... B32B 3/10; B32B 21/04
(52) U.S. Cl. .................... 428/50; 428/44; 144/345; 144/346; 144/350; 144/351
(58) Field of Search ...................... 144/351, 350, 144/346, 345; 428/50, 44

(56) References Cited

U.S. PATENT DOCUMENTS

| | | |
|---|---|---|
| 108,781 A | 11/1870 | Hamilton |
| 329,828 A | 11/1885 | Green |
| 436,041 A | 9/1890 | Koskul |
| 451,834 A | 5/1891 | Murch |
| 598,437 A | 2/1898 | Piver |
| 1,028,703 A | 6/1912 | Fulton |
| 1,078,776 A | 11/1913 | Dunton |
| 1,931,650 A | 10/1933 | Elmendorf .................... 20/7 |
| 2,037,259 A | 4/1936 | Murphy et al. .............. 20/75 |
| 2,118,841 A | 5/1938 | Elmendorf .................... 20/75 |
| 3,128,511 A | 4/1964 | Tibbals ...................... 20/78.3 |
| 3,209,500 A | 10/1965 | Bernett ...................... 52/309 |
| 3,282,010 A | 11/1966 | King ......................... 52/582 |
| 3,365,850 A | 1/1968 | Marino ....................... 52/309 |
| 3,579,410 A | 5/1971 | Barrett ....................... 161/38 |
| 3,730,797 A | 5/1973 | Jensen ....................... 156/182 |
| 3,810,774 A | 5/1974 | Pittman ...................... 117/12 |
| 3,887,736 A | 6/1975 | Kaswell ...................... 428/87 |
| 3,905,172 A | 9/1975 | Blackburn ................... 52/741 |
| 4,064,301 A | * 12/1977 | Howard |
| 4,774,794 A | * 10/1988 | Grieb ......................... 52/309.7 |
| 4,784,887 A | * 11/1988 | Abendroth |
| 4,890,656 A | * 1/1990 | Ohsumi et al. |
| 5,182,892 A | 2/1993 | Chase ......................... 52/539 |
| 5,322,584 A | 6/1994 | Severson et al. ............. 156/257 |

FOREIGN PATENT DOCUMENTS

WO     WO 98/10157    * 3/1998

* cited by examiner

*Primary Examiner*—Shrive P. Beck
*Assistant Examiner*—Elena Tsoy
(74) *Attorney, Agent, or Firm*—Wolff & Samson

(57) ABSTRACT

The present invention relates to a method for forming a decorative, resilient, wood product from an engineered structural wood product. The invention includes utilizing a sheet of engineered structural wood product, cutting the sheet lengthwise into planks, stacking the planks and adhering the planks together and slicing the edge grain off the adhered planks and placing the slices side-by-side to form large areas of exposed side grain. The slices can be attached to a substrate, and the slices can be further treated to produce a decorative wood product.

22 Claims, 4 Drawing Sheets